J. M. WOODS.
VEHICLE WHEEL.
APPLICATION FILED JUNE 29, 1914.
1,241,805.
Patented Oct. 2, 1917.
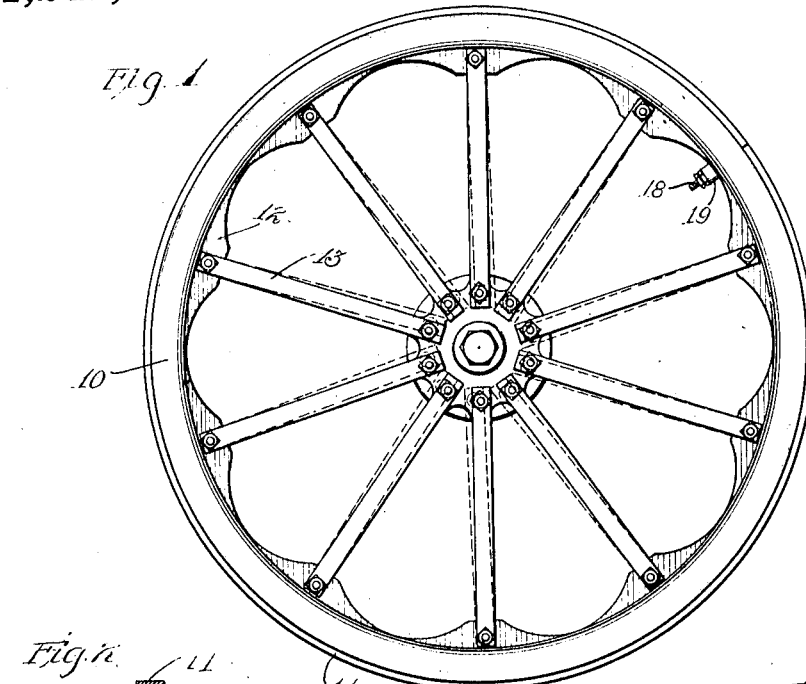
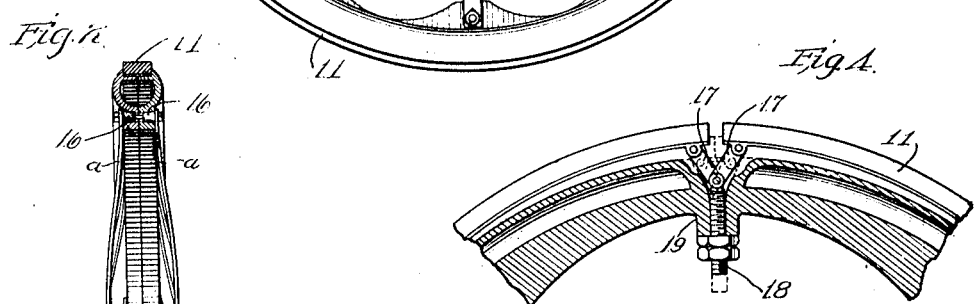
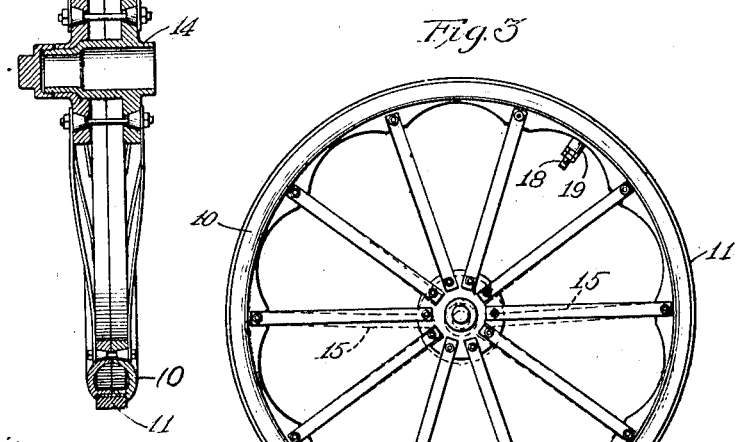
Inventor
Joseph M. Woods
Wallace R. Lane
Atty.

UNITED STATES PATENT OFFICE.

JOSEPH M. WOODS, OF CHICAGO, ILLINOIS, ASSIGNOR OF ONE-HALF TO D. W. JOHNSON, OF CHICAGO, ILLINOIS.

VEHICLE-WHEEL.

1,241,805.        Specification of Letters Patent.        Patented Oct. 2, 1917.

Application filed June 29, 1914. Serial No. 847,807.

*To all whom it may concern:*

Be it known that I, JOSEPH M. WOODS, a citizen of the United States, residing at Chicago, in the county of Cook and State of Illinois, have invented certain new and useful Improvements in Vehicle-Wheels; and I do declare the following to be a full, clear, and exact description of the invention, such as will enable others skilled in the art to which it appertains to make and use the same.

My invention relates to wheels of the spring type and is particularly adapted for use on automobiles and the like.

It is an object of my invention to provide a wheel of this class so designed that while used without a pneumatic tire, it affords substantially all the advantages of a wheel provided with such a tire as is now commonly used, in that the spokes are so designed as to permit of an outward and inward movement of the hub relative to the periphery of the wheel when the vehicle is rounding a corner or curve or when it encounters depressions in the road way and are so connected to the hub and rim as to permit the spokes to give sufficiently to take up the jar or motion experienced when the wheels of the vehicle encounter an obstruction in the roadway.

It is a further object of my invention to provide a wheel of this type so designed that the hub will partially rotate in either direction without rotating the rim when undue strains are imposed upon the hub, such, for example, as that caused by the sudden starting or stopping of the vehicle, whereby the strain on the transmission gear is greatly relieved and the stripping of gears materially lessened.

A further object of my invention is to provide simple, durable and efficient means for adjustably securing a tire of leather or similar material on the periphery of the rim of the wheel.

The above and other features of novelty, advantages and capabilities will become apparent from a detailed description of the accompanying drawings in which I have illustrated a practical embodiment of the invention but the construction shown therein is to be considered as illustrative only, and as not defining the limits of the invention.

Figure 1 is a side elevation of a wheel embodying my invention, showing in dotted lines the position of the spokes when the hub is partially rotated without rotating the rim of the wheel caused by an undue strain on the hub, such, for example, as that imposed by the sudden starting or stopping of the vehicle.

Fig. 2 is a transverse sectional view of the wheel shown in Fig. 1.

Fig. 3 is an elevation of the wheel showing in dotted lines the position of the spokes when the wheels of the vehicle encounter an obstruction in the roadway.

Fig. 4 is an enlarged detailed view showing the adjustable means for securing a tire of leather or similar material to the rim of the wheel.

The hollow rim 10 shown in the drawings is provided with a channel on its periphery to receive the tire 11 and on its inner side with a plurality of shoulders 12 to which are pivotally attached at one end, the spokes 13. The hub 14 is provided with a pair of circular flanges to which the spokes are pivotally attached at their opposite ends.

To permit the hub to move inwardly or outwardly with respect to the rim for the purpose of relieving the wheel of undue strain when the vehicle is taking a curve or encounters a depression in the roadway, the spokes 13 extend away from the hub substantially in a straight line for approximately one-half the distance between the hub and rim and are then curved inwardly to the point *a* and thence extend outwardly in a substantially straight line to the rim so that when the hub is moved either inwardly or outwardly, the spokes are allowed to give until they have reached a straight line or are drawn taut, and upon releasing the strain, the hub is by the peculiar curvature of the spokes, returned to its normal position. This arrangement produces a rolling action of the wheel as a whole similar to that produced by a wheel provided with a pneumatic tire.

By pivoting the spokes to the rim and hub, the hub is allowed to give sufficiently to take up the jar or motion experienced when the wheel encounters an obstruction. When such occurs, the spokes take the position shown in dotted line in Fig. 3, the load on the hub being at all times supported by all the spokes except the side spokes which are in Fig. 3 indicated at 15. If the spokes were rigidly attached to the hub and rim, the tendency would be to break or twist the side spokes from their fastenings when a vertically directed undue strain was imparted to the hub.

It will be seen that by constant wear, the connection of the spokes with the rim and hub will become loose. To overcome this, the openings in the rim and hub are of a cone shape in which are inserted cone shaped collars or sleeves 16. The diameter of the periphery of the outer edge of these collars is, of course, somewhat larger than the diameter of the opening in the rim and hub where the collars are new. To secure the spokes to the rim, a bolt is passed through each pair of spokes and the collar and rim and provided on one end with an adjustable nut so that the spokes can be properly adjusted by simply adjusting the nut. The opposite ends of the spokes are secured in a similar manner to the flanges of the hub. From this, it will be seen that in the event any of the spokes should become broken, they can be easily and readily replaced.

For properly securing the tire 11 on the periphery of the rim, I provide a binding strip of any suitable form which is secured to the inner side of the tire in any practicable manner and may be applied thereto during the process of formation or subsequently. At each end of the binding strip there is pivotally secured at one end, links 17 which links are at their opposite ends pivotally connected with a threaded bolt 18 which bolt passes through a screw threaded nut on the boss 19. From this, it will be seen that by simply adjusting the nut on the bolt 18 by a suitable instrument, such as a wrench, the tire 11 may be drawn tightly on the rim of the wheel.

My invention is capable of modifications other than the form illustrated in the drawings and hereinbefore described, but I do not wish to be understood as limiting myself to the specific forms shown, except in those claims where these features are specified.

I claim:

1. In a vehicle wheel comprising a plurality of spokes, means for pivotally attaching said spokes to the hub and rim so designed as to permit said spokes to adjust themselves in the plane of the wheel, said means comprising cone shaped sleeves adapted to fit into cone shaped openings and means for connecting said spokes with said sleeves and adjustably forcing the sleeves into said openings as described.

2. In a vehicle wheel comprising a hub, a rim, a plurality of spokes pivotally attached to the hub and extending away therefrom a substantial distance in a plane parallel to the plane of the wheel, and thereafter curved inwardly and pivotally attached to the rim without crossing over the medial plane of the wheel.

In witness whereof, I hereunto subscribe my name to this specification in the presence of two witnesses.

JOSEPH M. WOODS.

Witnesses:
I. V. CURRAN,
D. W. JOHNSON.

Copies of this patent may be obtained for five cents each, by addressing the "Commissioner of Patents, Washington, D. C."